July 23, 1940.  O. E. SHIPMAN  2,209,300

FISHHOOK

Filed Dec. 29, 1938

Inventor:
Orville E. Shipman

Patented July 23, 1940

2,209,300

UNITED STATES PATENT OFFICE 2,209,300

FISHHOOK

Orville E. Shipman, Rossville, Ind.

Application December 29, 1938, Serial No. 248,227

2 Claims. (Cl. 43—36)

This invention relates to improvements in that class of invention known as spring actuated fishhooks.

It is the principal object of this invention to provide a device of the character described wherein the spring actuated hook carrying arms are releasably held in close relation with each other so that when a fish bites the baited hooks, a pull will be exerted on the arms, to release the arms and assure of the spreading thereof inside the fish's mouth, to hook and prevent the escape thereof.

It is a more specific object of this invention to provide a device of the above character wherein provision is made for adjusting the trigger pull, either more or less sensitive for the purpose of adapting it to more usefully serve the different methods of fishing. By trigger pull, is meant the amount of pull exerted on the baited hooks which is required to cause the spring actuated hooks to release and expand.

It is an additional object of this invention to provide a device of the above described character which is simple in construction, more dependable in its action and inexpensive in manufacture.

The invention is clearly illustrated in the accompanying drawing, in which.

Figure 1:
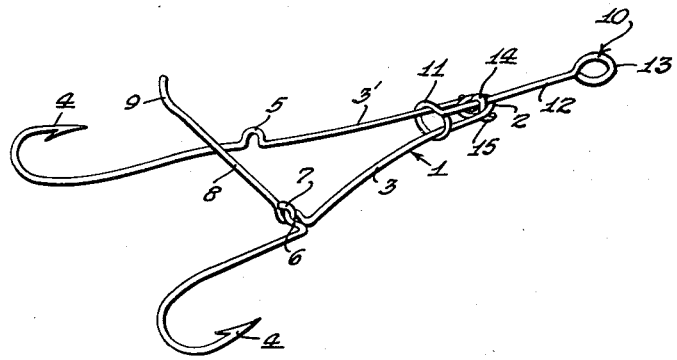
Figure 1 is a perspective view of the device in open position.
Figure 2:
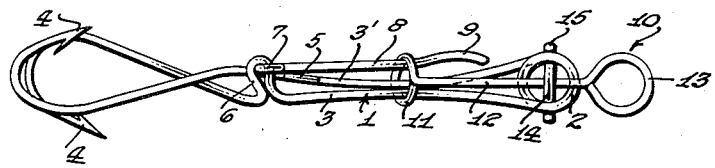
Figure 2 is a top plan view of the device in closed position.
Figure 3:
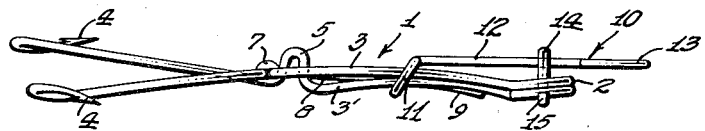
Figure 3 is a side view of the device.

My improved fishhook consists of a body 1, which is formed from a single piece of resilient wire bent intermediate its ends to form a spring coil 2. Arms 3 and 3' continue from the opposite sides of the coil and terminate in fishhooks 4 of any desired form.

To provide means for holding the arms 3 and 3' in close relation with each other, a small narrow loop 5 is formed in arm 3', at right angles thereto. In the arm 3, a little farther out from the coil 2 an eye 6 is formed. In the eye 6 there is pivotally and loosely mounted a loop 7, which is formed on one end of a lever 8. The lever 8 is constructed from a single piece of wire. The outer end 9 of the lever 8 is slightly curved. The lever 8 is designed to engage the loop 5 and be parallel with the arm 3', with the end 9 terminating in proximity to coil 2, when the arms 3 and 3' are in the closed position. Cooperating with the outer curved end 9 of the lever 8, is the sliding trigger 10, made of a single piece of wire having a loop 11, which is formed on the inner end of the shank 12. On the outer end of the shank 12 there is formed the eye 13 for attachment to a fishing line. The loop 11 is loosely and slidably mounted around both arms 3 and 3' and the outer end of the lever 8 when the device is in the closed position. Trigger loop 11 is designed to removably hold the arms 3 and 3' and the lever 8 in a closely related position, to vary the leverage and the resulting friction, thereby determining the hook's trigger pull according to its position and yet to release and allow the arms to expand when a pull is exerted on the baited hooks by a fish in the act of biting. To assure smooth and dependable action, a trigger loop guide 14 is formed from a single strand of soft wire, bent intermediate its ends to form a U shaped loop which passes around the shank 12 of the sliding trigger 10, its outer bent ends 15 passing back around the outside of coil 2 to form a loose pivotal guide through which the shank 12 slides.

To use this improved fishhook, it is first placed in the closed position by compressing the arms 3 and 3' until they are parallel and closely related. Then lever 8 is placed over loop 5 and then made parallel with the arms 3 and 3'. Trigger loop 11 is then placed to the left and over the curved outer end 9 of the lever 8. It can now be observed that if the trigger loop is placed entirely to the left of the curved end 9, the leverage will be less, the friction more and therefore the trigger pull will be less sensitive. On the contrary, if the trigger loop 11 is placed to the right on the curve, or in other words, on the outer end of lever 8, the leverage will be more, the friction less and trigger pull will be more sensitive.

This improved spring hook is to be baited or lured and used the same as is already common practice.

Having thus described this invention, what is claimed as new and desired to be secured by Letters Patent is:

1. A fishing device comprising arms, a spring coil connecting adjacent ends of the arms, said spring coil tending to spread the arms apart, hooks at the other ends of the coils, a lever pivotally connected to one of said arms, a loop on the other arm, said loop engaging said lever, a trigger, said trigger consisting of a shank, a loop at one end of said shank, said last named loop embracing said arms and being adapted to embrace the free end of said lever when said device is in closed position, an eye on the end of said trigger shank for the attachment of a line, and a guide loosely mounted on said coil, said guide having a U-shaped portion through which said trigger shank slides when said device is being changed from the open to the closed position.

2. A fishing device comprising a body in the form of a single piece of wire, said body consisting of two arms situated side by side, a spring coil connecting a pair of adjacent ends of the arms, opposed hooks on the other ends of the arms, an eye on one arm intermediate its ends, a loop on the other arm, said loop being a little nearer said spring coil than said eye, a lever pivotally connected to said eye, said lever being in the form of a single piece of wire and consisting of a shank, an eye at one end of the shank and a curved portion at the other end of the shank, said lever eye being connected to said arm eye, a trigger, said trigger consisting of a shank, a loop at one end of the shank and embracing said arms, an eye at the other end of the shank for the attachment of a line, said trigger loop being adapted to embrace the free end of said lever when the device is in closed position, and a guide, said guide being in the form of a single piece of wire having its middle part of U-shape and its ends curved, said middle part embracing the trigger shank, and said curved ends embracing said coil.

ORVILLE E. SHIPMAN.